(12) United States Patent
Nagarajan

(10) Patent No.: US 11,138,126 B2
(45) Date of Patent: Oct. 5, 2021

(54) TESTING HIERARCHICAL ADDRESS TRANSLATION WITH CONTEXT SWITCHING AND OVERWRITTEN TABLE DEFINITION DATA

(71) Applicant: Arm Limited, Cambridge (GB)

(72) Inventor: Pradeep Ganesan Nagarajan, Bangalore (IN)

(73) Assignee: Arm Limited, Cambridge (GB)

( * ) Notice: Subject to any disclaimer, the term of this patent is extended or adjusted under 35 U.S.C. 154(b) by 26 days.

(21) Appl. No.: 16/449,722

(22) Filed: Jun. 24, 2019

(65) Prior Publication Data
US 2020/0026660 A1 Jan. 23, 2020

(30) Foreign Application Priority Data
Jul. 23, 2018 (GB) ...................................... 1811966

(51) Int. Cl.
*G06F 12/10* (2016.01)
*G06F 12/1009* (2016.01)
*G06F 12/1027* (2016.01)

(52) U.S. Cl.
CPC ...... *G06F 12/1009* (2013.01); *G06F 12/1027* (2013.01); *G06F 2212/65* (2013.01); *G06F 2212/68* (2013.01)

(58) Field of Classification Search
CPC ............. G06F 12/1009; G06F 12/1027; G06F 2212/65; G06F 2212/68
See application file for complete search history.

(56) References Cited

U.S. PATENT DOCUMENTS

2006/0136694 A1* 6/2006 Hasbun ................. G06F 12/145
711/173
2011/0208935 A1* 8/2011 Grisenthwaite ....... G06F 12/145
711/163

(Continued)

OTHER PUBLICATIONS

Paul Krzyzanowski, Memory Management: Paging, Mar. 21, 2012, Rutgers, Available at: https://www.cs.rutgers.edu/~pxk/416/notes/10-paging.html (Year: 2012).*
Ulrich Drepper, Memory Part 3: Virtual Memory, Oct. 9, 2007, LWN.net, Available at: https://lwn.net/Articles/253361/ (Year: 2007).*
Combined Search and Examination Report for GB1811966.9, dated Jan. 23, 2019, 6 pages.

(Continued)

*Primary Examiner* — Ryan Bertram
(74) *Attorney, Agent, or Firm* — Nixon & Vanderhye P.C.

(57) ABSTRACT

Data processing apparatus comprises one or more processing elements to execute processing instructions; address translation circuitry to perform address translations between a virtual address space and a physical address space, the address translations being defined by a current hierarchical set of address translation tables selected from two or more hierarchical sets of address translation tables, the address translation circuitry being responsive to current table definition data providing at least a pointer to a memory location of the current hierarchical set of address translation tables; the one or more processing elements being configured to overwrite the current table definition data with second table definition data providing at least a pointer to a memory location of a second, different, hierarchical set of address translation tables of the two or more hierarchical sets of address translation tables; the one or more processing elements being configured to execute test instructions requiring address translation before and after the overwriting of the current table definition data by the control circuitry and to detect whether the address translations required by the test instructions are correctly performed.

12 Claims, 10 Drawing Sheets

(56) References Cited

U.S. PATENT DOCUMENTS

| | | | | |
|---|---|---|---|---|
| 2012/0005454 A1* | 1/2012 | Waugh | ............... | G06F 12/1027 |
| | | | | 711/207 |
| 2012/0151116 A1* | 6/2012 | Tuch | .................. | G06F 12/1483 |
| | | | | 711/6 |
| 2013/0173882 A1* | 7/2013 | Bhowmik | ........... | G06F 12/1036 |
| | | | | 711/207 |
| 2013/0185720 A1* | 7/2013 | Tuch | ..................... | G06F 12/023 |
| | | | | 718/1 |
| 2015/0121046 A1* | 4/2015 | Kunjan | ............... | G06F 9/30043 |
| | | | | 712/225 |
| 2018/0121365 A1* | 5/2018 | Bussa | ................. | G06F 12/1009 |
| 2018/0336141 A1* | 11/2018 | Desai | ................. | G06F 12/1054 |
| 2019/0065737 A1* | 2/2019 | Paek | ...................... | G06F 21/53 |

OTHER PUBLICATIONS

ARM Architecture Reference Manual, ARMv7-A and ARMv7-R edition (2014), (ARM) [see pp. A3-152-153, B3-1311-12, 1320-21, 1324-25 and especially note Synchronisation of changes of ASID and TTBR: B3-1386-1388 and Appendix D7 Barrier Litmus Tests D-2450-2451], 13 pages.

Examination Report for GB Application No. 1811966.9 dated May 10, 2021, 5 pages.

P. Krzyzanowski, "Operating Systems Design 8. Memory Management" lecture slides, course CS 416, Rutgers University, Oct. 6, 2010, 25 pages.

Examination Report for GB Application No. 1811966.9 dated Jul. 29, 2021, 6 pages.

* cited by examiner

TESTING HIERARCHICAL ADDRESS TRANSLATION WITH CONTEXT SWITCHING AND OVERWRITTEN TABLE DEFINITION DATA

This application claims priority to GB Patent Application No. 1811966.9 filed 23 Jul. 2018, the entire contents of which is hereby incorporated by reference.

BACKGROUND

This disclosure relates to data processing.

Memory Management allows the building of data processing systems with multiple virtual address maps, so that each application running on an operating system can have its own virtual memory mappings. Each application will be located in a separate address space in physical memory. The MMU maps memory addresses used by an application, called virtual addresses, into physical addresses in memory using translation tables. Translation tables are for example tree-shaped table data structures created by software in memory.

MMU hardware generally traverses the translation tables to accomplish virtual address translation. Traversing a translation table can involve performing several memory accesses to read the translation tables.

Translation Lookaside Buffers (TLBs) are caches of recently executed page translations within the MMU used to speed up the address translation process.

Context switch is a feature of a multitasking operating system that enables multiple processes to share a processing element. It is a process of storing and restoring the execution context of a process so that execution can be resumed from the same point later. On a context switch, the kernel also switches translation table entries to the pages of next application to be run. An Application Space Identifier (ASID) value can be associated with each application so that multiple entries within the TLB at any time may be valid for a given virtual address.

SUMMARY

In an example arrangement there is provided data processing apparatus comprising:

one or more processing elements to execute processing instructions;

address translation circuitry to perform address translations between a virtual address space and a physical address space, the address translations being defined by a current hierarchical set of address translation tables selected from two or more hierarchical sets of address translation tables, the address translation circuitry being responsive to current table definition data providing at least a pointer to a memory location of the current hierarchical set of address translation tables;

the one or more processing elements being configured to overwrite the current table definition data with second table definition data providing at least a pointer to a memory location of a second, different, hierarchical set of address translation tables of the two or more hierarchical sets of address translation tables;

the one or more processing elements being configured to execute test instructions requiring address translation before and after the overwriting of the current table definition data by the control circuitry and to detect whether the address translations required by the test instructions are correctly performed.

In another example arrangement there is provided a method comprising:

executing processing instructions;

performing address translations between a virtual address space and a physical address space, the address translations being defined by a current hierarchical set of address translation tables selected from two or more hierarchical sets of address translation tables, the address translation being responsive to current table definition data providing at least a pointer to a memory location of the current hierarchical set of address translation tables;

overwriting the current table definition data with second table definition data providing at least a pointer to a memory location of a second, different, hierarchical set of address translation tables of the two or more hierarchical sets of address translation tables;

executing test instructions requiring address translation before and after the overwriting of the current table definition data and to detect whether the address translations required by the test instructions are correctly performed.

In another example arrangement there is provided a computer program for controlling a host data processing apparatus to provide a simulation environment comprising:

one or more processing elements to execute processing instructions;

an address translation module to perform address translations between a virtual address space and a physical address space, the address translations being defined by a current hierarchical set of address translation tables selected from two or more hierarchical sets of address translation tables, the address translation module being responsive to current table definition data providing at least a pointer to a memory location of the current hierarchical set of address translation tables;

the one or more processing elements being configured to overwrite the current table definition data with second table definition data providing at least a pointer to a memory location of a second, different, hierarchical set of address translation tables of the two or more hierarchical sets of address translation tables;

the one or more processing elements execute test instructions requiring address translation before and after the overwriting of the current table definition data and to detect whether the address translations required by the test instructions are correctly performed.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DATA PROCESSING USING MEMORY ADDRESS TRANSLATION

Figure 1:
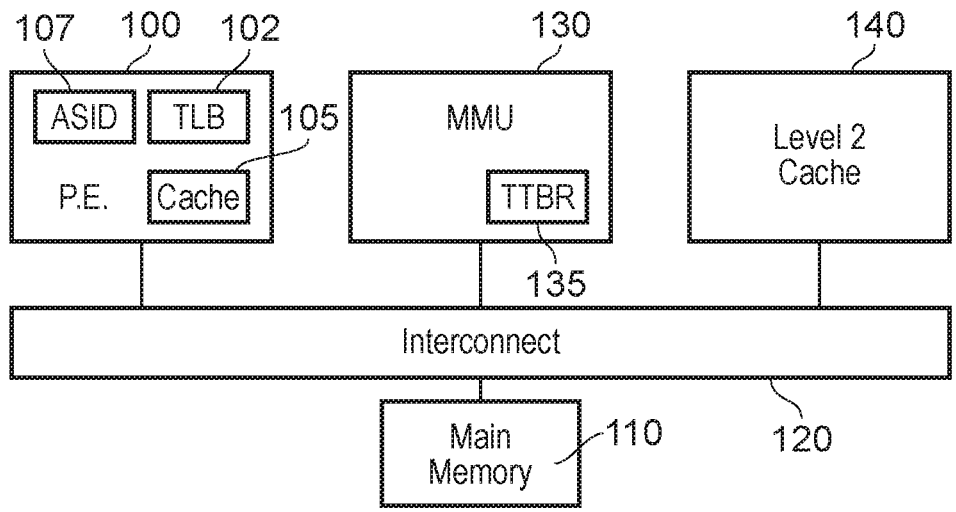
FIG. 1 schematically illustrates a data processing system.

Referring now to the drawings, FIG. 1 schematically illustrates a data processing system. A processing element (PE) 100 having a local cache memory 105 is arranged to access data stored in a main memory 110 via an interconnect 120. A memory management unit (MMU) 130 is connected to the interconnect 120 to handle memory address translation. The MMU is associated with a translation table base address (TTBR) register 135 to be discussed further below.

The PE 100 and/or the MMU makes use of a translation lookaside buffer (TLB). In the present example, a TLB 102 is provided as part of the PE 100. The TLB is associated with an application space ID (ASID) register 107, to be discussed further below. During the operation of the system of FIG. 1, there is a routine need to access system memory. Memory addresses are expressed for the purposes of internal processing within the modules of the PE 100 as virtual addresses (VAs). In order to proceed with an actual access to system memory, a VA needs to be translated to a physical address (PA) by which the system memory is addressed at an electrical level. This translation is carried out by the TLB. The operation of a TLB will be discussed further with reference to FIGS. 2 and 3. The TLB 102 provides an example of a translation buffer to store data defining one or more address translations between the virtual address space and the physical address space.

A level 2 cache 140 provides a local, and generally somewhat faster, storage area for selected contents of the main system memory. Recently or frequently accessed portions of the main system memory, or portions of the main system memory which are expected to be required in the near future such as portions adjacent to recently accessed portions, are replicated in the level 2 cache 140 so that those portions can be accessed quickly when needed. If a required portion is not currently held in the level 2 cache 50, then that portion is fetched from the main system memory when access to that portion is required. In these respects, the level 2 cache 140 operates according to established principles associated with such cache memories and so details of its operation will not be described except where they are relevant to the present discussion. It is noted that the contents of the level 2 cache memory 140 are accessed according to their physical address.

Figure 2:
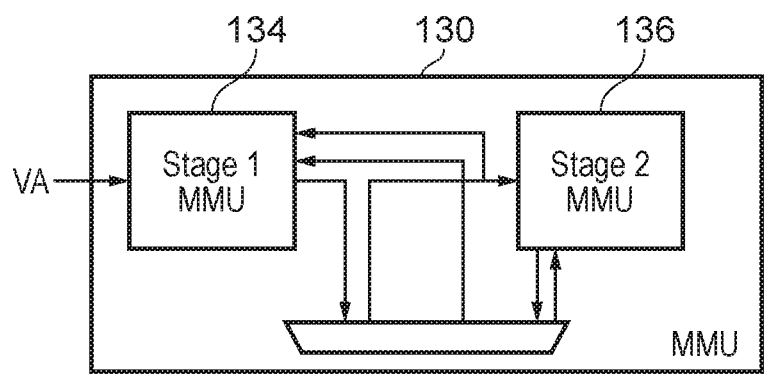
FIG. 2 schematically illustrates a two-stage MMU.
Figure 3:
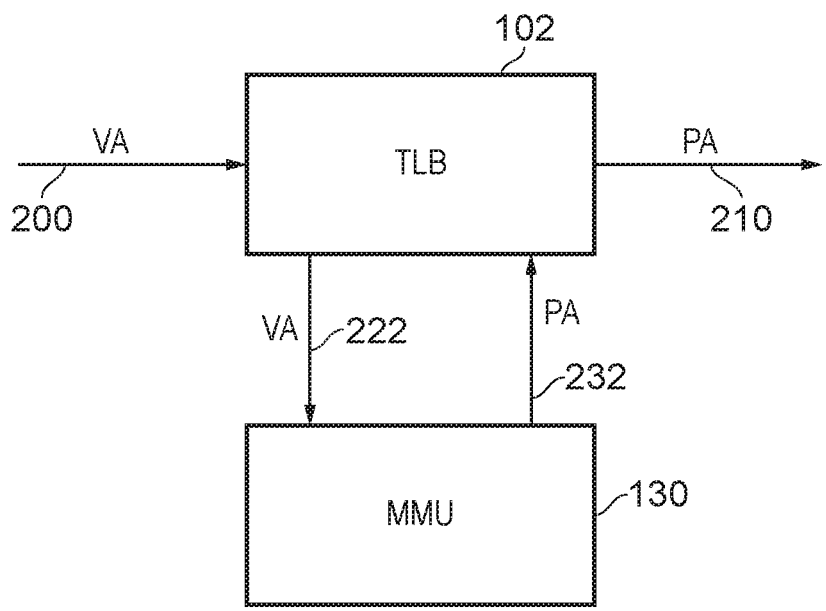
FIG. 3 schematically illustrates the use of a memory management unit (MMU) and a translation lookaside buffer (TLB)

As shown in FIG. 2, the MMU 130 may be a two-stage MMU (as an example of a multiple stage MMU), comprising a stage 1 MMU 134 and a stage 2 MMU 136. A virtual address (VA) required by an executing program or other system module such as the PE 100 is translated to an intermediate physical address (IPA) by the stage 1 MMU. The IPA is translated to a physical address (PA) by the stage 2 MMU. One reason why multiple stage translation is used is for security of information handling when multiple operating systems (OS) may be in use on respective "virtual machines" running on the same processor. A particular OS is exposed to the VA to IPA translation, whereas only a hypervisor (software which oversees the running of the virtual machines) has oversight of the stage 2 (IPA to PA) translation.

Note that a two-stage MMU (VA to IPA, IPA to PA) does not use the term "stage" in the same way as a multiple stage PTW process to be described below.

A main reason why the MMU 130 is required is that it handles address translations which are not currently stored locally in the TLB 102. The way in which this is carried out will be discussed further below. In handling these matters, referring to FIG. 3, the MMU 130 receives requests 222 from the TLB via the interconnect 120 and returns responses 232 to the TLB, again via the interconnect 120.

Figure 4:
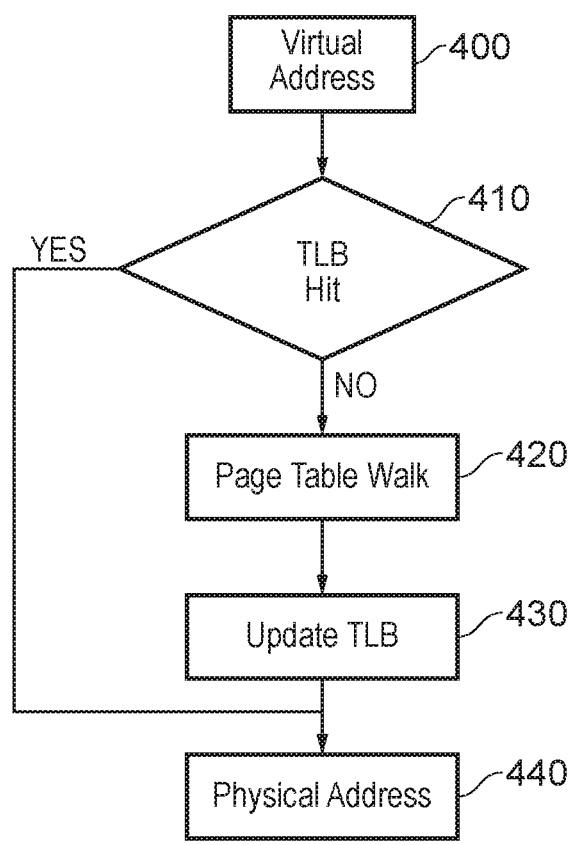
FIG. 4 is a schematic flowchart illustrating a method.

As part of the operation of the PE 100 or other arrangement with which a TLB 102 is associated, the TLB 102 receives a VA 200 relating to a required memory access. This could of course be a read or a write memory access; it is immaterial to the present discussion which type of memory access is underway. Referring also to FIG. 4 (which is a schematic flowchart illustrating operations of a TLB), supply of a VA 200 to the TLB 102 forms a request for a corresponding PA 210 (shown in FIG. 4 as a step 400).

The TLB contains a cache or store of translations between VA and PA. The criteria by which the TLB stores particular VA to PA translations can be established according to known techniques for the operation of a TLB. The cached translations might include recently used translations, frequently used translations and/or translations which are expected to be required soon (such as translations relating to VAs which are close to recently-accessed VAs). Overall, the situation is that the TLB contains a cache of a subset of the set of all possible VA to PA translations, such that when a particular VA to PA translation is required, it may be found that the translation is already held in the cache at the TLB, or it may not.

Accordingly, at a next step 410, the TLB detects whether the required translation is indeed currently cached by the TLB (a "hit"). If the answer is yes, then control passes to a step 440 at which the PA is returned for use in the required memory access.

If the answer is no, then control passes to a step 420 at which the TLB 102 sends a request, comprising the required VA 222, to the MMU 130. The MMU 130 derives the required VA to PA translation (using so-called page table walk (PTW) techniques to be discussed below) and sends at least the PA 232 corresponding to the VA 222 back to the TLB 102 where it is stored at a step 430.

Finally, at the step 440, the TLB 102 applies the translation stored at the TLB 102 to provide an output PA 210.

Page Table Walk

Figure 5:
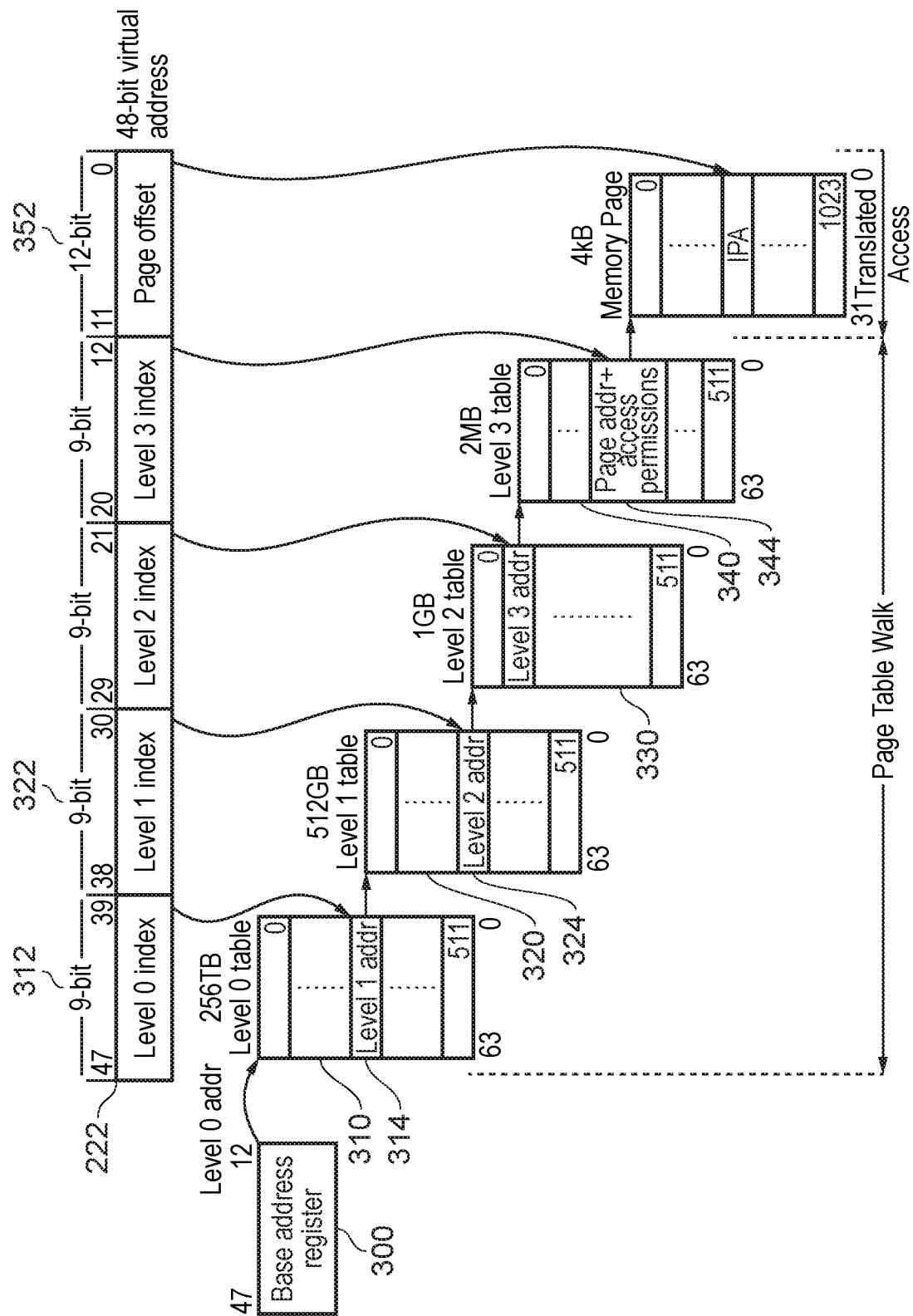
FIG. 5 schematically illustrates a so-called page table walk (PTW) process.

The PTW process involves traversing a hierarchical set of so-called page tables to arrive at a translation of a particular VA. In the case of a single stage memory translation, the output may be a PA. In the case of a multiple stage memory address translation, the process can be rather more involved. Accessing the page tables themselves requires a PA, so at each access of a next table in the hierarchy, a translation stage may itself be required in order to obtain the PA of the next required table. Having said this, FIG. 5 schematically illustrates an example of a stage 1 page table walk (PTW) process, and FIG. 6 is a schematic flowchart illustrating a PTW process.

In this example, a VA 222 which requires translation is formed as a 48-bit value. Different portions of the VA 222 are used at different stages in the PTW process.

Figure 6:
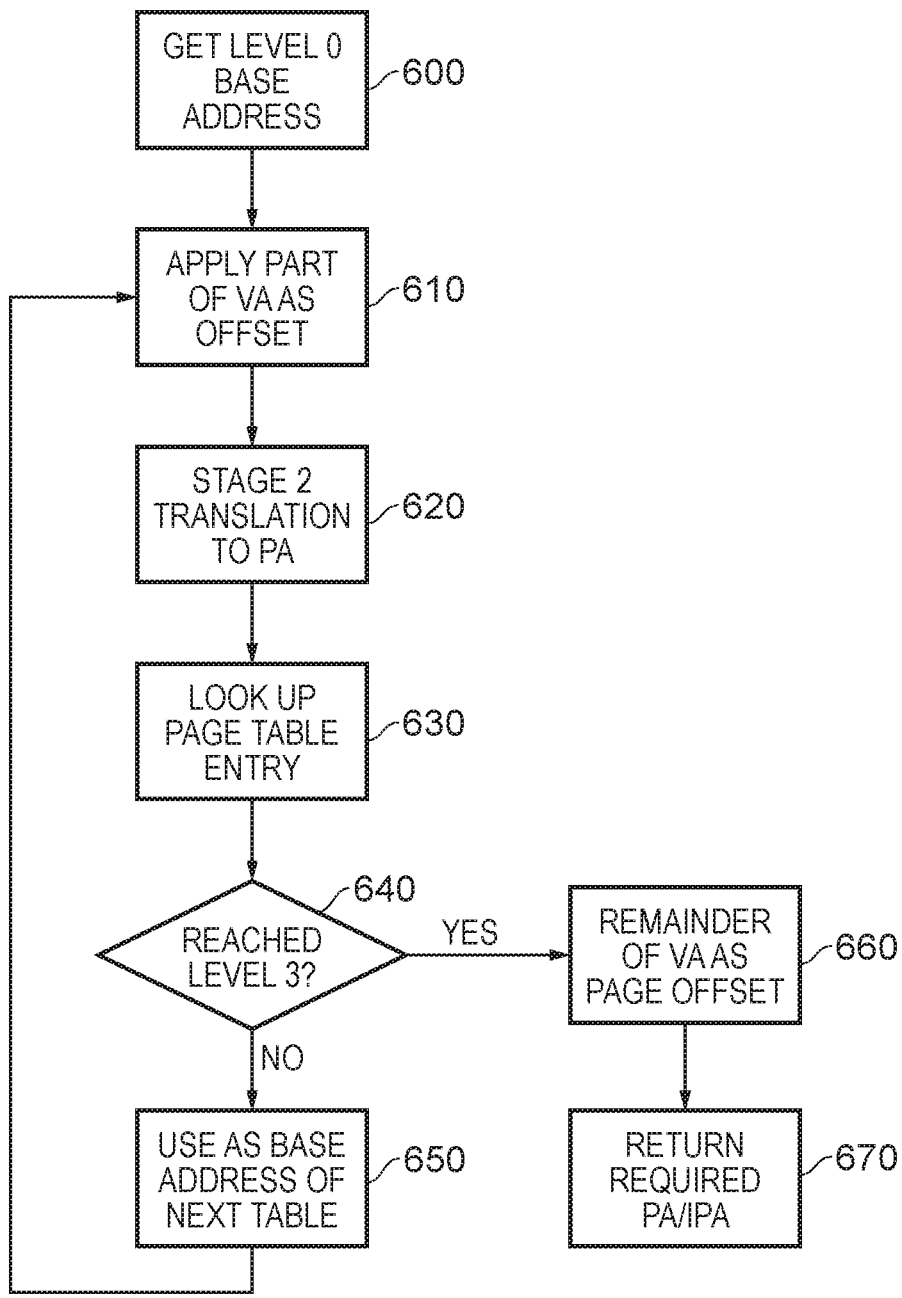
FIG. 6 is a schematic flowchart illustrating a method.

To obtain a first entry in the page table hierarchy, in a "level 0 table" 310, a base address stored in a base address register 300 (FIG. 5) corresponding to the TTBR 135 of FIG. 1 is obtained at a step 600 (FIG. 6). A first portion 312 of the VA 222, being (for example) the 9 most significant bits, is added to the base address as an offset, at a step 610 so as to provide the IPA 314 of an entry in the table 310. But in order to access the entry 314, a PA indicating the location of the entry 314 in physical memory is needed. Therefore, at a step 620, the IPA 314 of the page table entry is supplied to the stage 2 translation process for translation into a corresponding PA. When the corresponding PA is received, the relevant page table entry is looked up in physical memory or in the level 2 cache 50 (if the relevant page is cached) at a step 630.

At a step 640, a detection is made as to whether "level 3" has been reached in the page table hierarchy. If not, as in the present case, control passes to a step 650 at which the retrieved page table entry is used as a base address of a next table in the hierarchy. The page table entry corresponding to the IPA 314 therefore provides a base address to the next level table in the hierarchy, a "level 1 table" 320. Control returns to the step 610.

At the second iteration of the step 610, a further part 322 of the VA 222, being for example the next 9 bits [38:30] of the VA 222, forms an offset from the base address of the table 320 in order to provide the IPA of an entry 324 in the table 320. Once again, this IPA is subjected to stage 2 translation to provide a PA which can be looked up to obtain the base address of a "level 2 table" 330 which in turn (by the same process) provides the base address of a "level 3 table" 340.

When the steps 630 and 640 are carried out in respect of a page table entry defined by an IPA 344 in the table 340, the answer to the detection at the step 640 is "yes". The page table entry indicated by the IPA 344 provides a page address and access permissions relating to a physical memory page. The remaining portion 352 of the VA 222, for example the least significant 12 bits [11:0] provides a page offset within the memory page defined by the page table entry at the IPA 344, though in an example system which stores information as successive four byte (for example 32 bit) portions, it may be that the portion [11:2] provides the required offset to the address of the appropriate 32 bit word. Therefore, the combination (at a step 660) of the least significant portion of the VA 222 and the final page table entry (in this case, from the "level 3 table" 340) provides (at a step 670) the IPA 250 as a translation of the VA 222. Note that a PTW process as described here returns an IPA in respect of the PTW carried out by the stage 1 MMU, and returns a PA in respect of the PTW carried out by the stage 2 MMU.

In example embodiments, including some to be discussed below, the first MMU stage is configured to access a hierarchy of page tables, such that a page table higher in the hierarchy provides information for address translation by the second stage MMU to point to a page table next lower in the hierarchy, and a lowest page table in the hierarchy provides the set of two or more intermediate memory addresses including the corresponding intermediate memory address.

It will be appreciated however that fewer PTW stages than the number illustrated in FIGS. 5 and 6 can be employed.

Figure 7A:
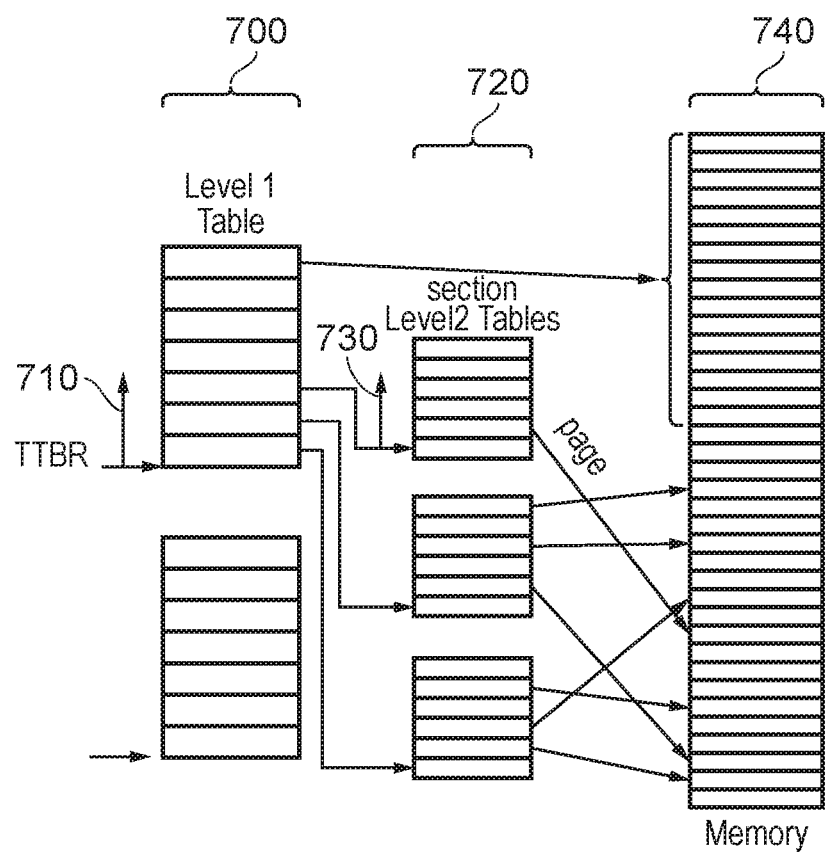
FIG. 7*a* schematically illustrates the use of page tables in a two-stage translation.

FIG. 7a provides a schematic summary of the use of page tables, in the example case of a two-stage PTW process, in which an entry in a level 1 table 700 is defined by the TTBR 135 plus an offset 710 dependent upon at least a part of the VA to be translated. The page table entry in the level 1 table points to a level 2 table 720 location, and an entry in the level 2 table is obtained from that base address plus an offset 730 dependent upon another part of the VA to be translated. The selected level 2 table entry (in this simplified example) points to a physical location in memory 740.

Figure 7B:
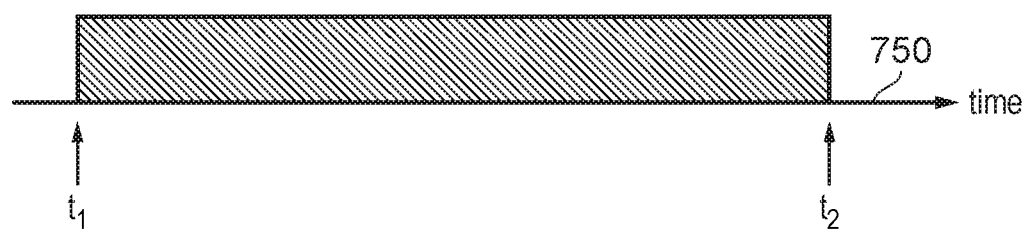
FIG. 7*b* is a schematic timing diagram.

FIG. 7b schematically illustrates this process along a time axis 750, in that between initiating a translation (not found in the TLB) at a time t1 there can be a significant period of time before the translation is returned at a later time t2, for example many hundreds of clock cycles. This delay t2-t1 can be attributed to the multiple memory accesses needed to conduct the PTW process.

Context Switching

At least one aspect of the relevance of these techniques to so-called context switching will now be discussed.

The apparatus of FIG. 1 may operate in association with an operating system which oversees at least some processing operations of the apparatus, and which may oversee a context switching or task switching process.

Figure 8:
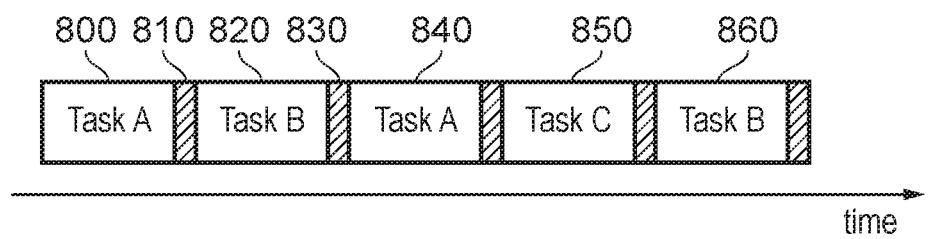
FIG. 8 schematically illustrates task switching by a processing element.

FIG. 8 schematically illustrates task switching by a processing element such as the processing elements 100 of FIG. 1.

In general terms, program functions are carried out by the PE 100 executing program code and referred to here as "tasks". An example of a task is a processing thread. Execution of a task may take place for a particular period and then the processing element can switch to execution of a different task before, potentially, returning to the first task for another period and so on.

In between these periods, a so-called context switch takes place. The context switch involves saving a current state of the processing element at the end of execution of a particular task and restoring a previously saved stated of the processing element in preparation for a period of execution of another task. Overall, this can give the impression that the processing element is handling multiple programs or "threads" at once, whereas in fact it is executing small portions of each task intermittently.

In the example of FIG. 8, the processing element executes, for a period 800, a first task (task A). There is then a short period 810 during which the context switch referred to above takes place. Here, the processing element saves context data relating to the program task A following execution of that program task by the processing element, and loads context data, previously saved by that processing element or another processing element, at resumption of execution of a next task (task B) in a period 820.

So, it can be seen that a particular processing element may execute a particular task for a period, but then having saved the context data relating to that task, execution of that task may next be taken up in a subsequent period by that processing element another of the inter-connected processing elements.

At the end of execution of task B in the period 820, a context switch occurs in a period 830 followed by execution of task A again in a period 840, with subsequent tasks in this example being task C in a period 850 and task B in a period 860.

The arrangement of FIG. 8 relates to one processing element such as the PE 100. In the system of FIG. 1, there could be further example processing elements (not shown) and each may be switching between tasks in the manner shown. This means that a particular task may be executed by successive (though not necessarily contiguous) periods of execution on any of the processing elements, with the saved context data being used to facilitate the switching of the task from one processing element to another.

Note that in some examples, the "next processing element" can be the same processing element as the "previous processing element". A task can be terminated at one processing element by a timeout, an internal or external signal (such as an interrupt), a scheduler command, an operating system command (by an operating system overseeing at least some processing activities or operations of the apparatus) or the like.

Figure 9:
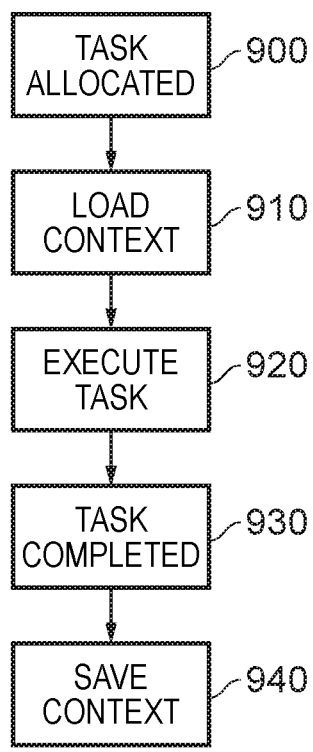
FIG. 9 is a schematic flowchart illustrating task execution.

FIG. 9 is a schematic flowchart illustrating some basic aspects of task execution in the manner described with reference to FIG. 8.

At step 900, a task is allocated to a particular processing element. The allocation of tasks is carried out by a scheduling process running on the PE 100 or another PE, for example.

At a step 910, the processing element 100 loads previously-saved context data relating to that task (saved by the previous processing element to execute that task, whether or not that is the same processing element as the one about to execute the task) and at a step 920 executes the task for a period of time.

The step 910 can involve, for example: loading an ASID value to the ASID register 107, loading a page table base address to the TTBR register, optionally initiating flushing of the TLB (discussed below), loading processor register values and loading other processor state variables.

Note that the steps 910, 920 may overlap in time. A certain amount of context data may be required in order to start the execution of a task, in response to receipt of which the next processing element can start to execute the task, but other items of context data may be loaded after execution has started or may even be deferred until they are required (a so-called "lazy" loading of context data). This arrangement can provide for potentially faster context switching because it can reduce the amount of context data which has to be loaded before task execution can even start, so allowing execution to start sooner than would be possible if every possible item of context data were first loaded before commencing execution.

The execution of the task can continue until, for example, a processor interrupt is received which may be due to an external interrupt situation or may be in response to a timer indicating that the period of time allocated to that particular instance of execution of that task has come to an end. At a step 930, that instance of execution of that task is completed and, following execution of that program task, context data (such as processor state variables and registers, ASID, TTBR) is saved at a step 940. The process of FIG. 9 may then be restarted by that processor in respect of a next task to be executed.

The use of context switching provides an example in which the one or more processing elements are configured to execute processing instructions of a current program task; the one or more processing elements are configured to switch between processing tasks and to provide context data relating to execution of a program task in response to switching from execution of that processing task; and to receive context data, provided by that processing element or another processing element, at resumption of execution of a program task; the context data for a processing task including translation context data comprising at least the table definition data providing at least a pointer to a memory location of a hierarchical set of address translation tables defining address translations between a virtual address space applicable to that program task and the physical address space.

TLB Operation at Context Switching

As mentioned above, the PE 100 stores the ASID 107. The MMU may also store the current ASID. The ASID provides an identifier for the current address translations applicable to the currently executing task. It can be changed at a context switch.

Figure 10:
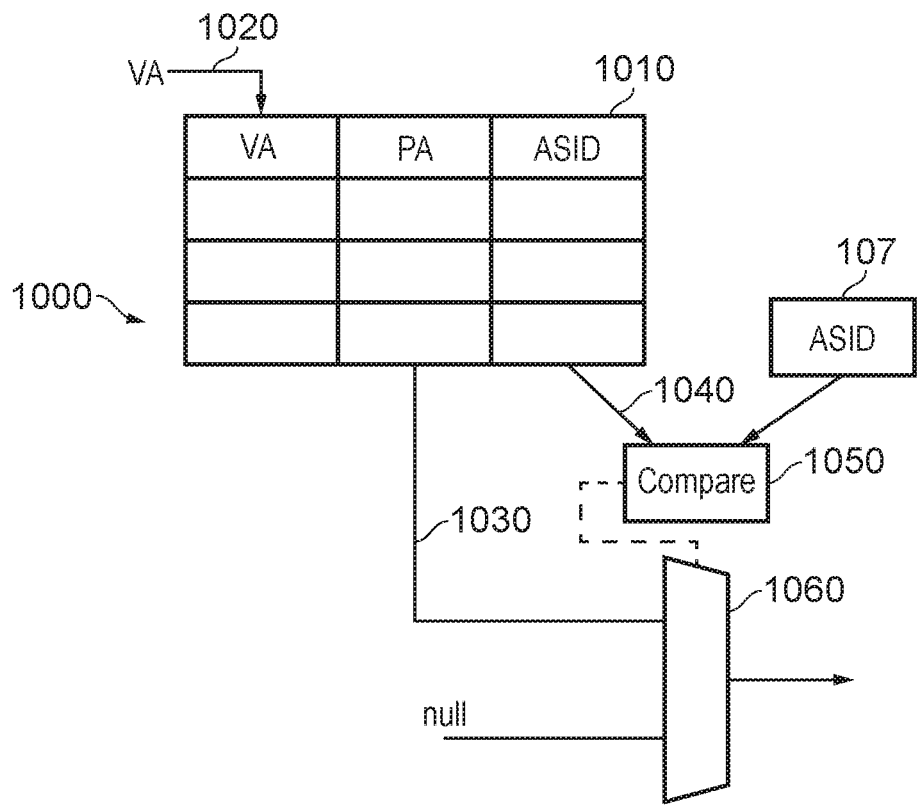
FIGS. 10 and 11 schematically illustrate the use of a TLB.

FIG. 10 schematically illustrates an example of a TLB 1000 which makes use of a stored ASID 1010 associated with each address translation (each row in FIG. 10) held by that TLB. The stored ASID shows the ASID which applied at the time at which the address translation was initiated and subsequently cached by the TLB 1000.

When a translation of an input VA 1020 is required, the TLB 1000 outputs a PA 1030 and the relevant ASID 1030. In the schematic example of FIG. 10, a comparator 1050 compares the retrieved ASID 1040 with the current ASID 107. If the two are the same then the PA is provided as an output by a multiplexer 1060. If not, a null output (translation not cached) is output.

It will be appreciated that these principles can be applied where, for example, multiple translations of the same VA or VA range, but for different ASIDs, are cached by the TLB, such that the one which is relevant to the current ASID 107 is output. Similarly, where entries in the TLB need to be overwritten by newly cached entries, those relating to ASIDs other than the current ASID 107 can be selected for overwriting.

Therefore, in FIG. 10, the translation buffer 1000 is configured to associate an identifier (ASID 1010) with each of the one or more address translations, the identifier indicating a corresponding one of the hierarchical set of address translation tables; and the address translation circuitry is configured to apply an address translation to a given virtual address using an address translation stored by the translation buffer when an address translation of that virtual address having an associated identifier corresponding to the current hierarchical set of address translation tables is stored by the translation buffer.

Figure 11:
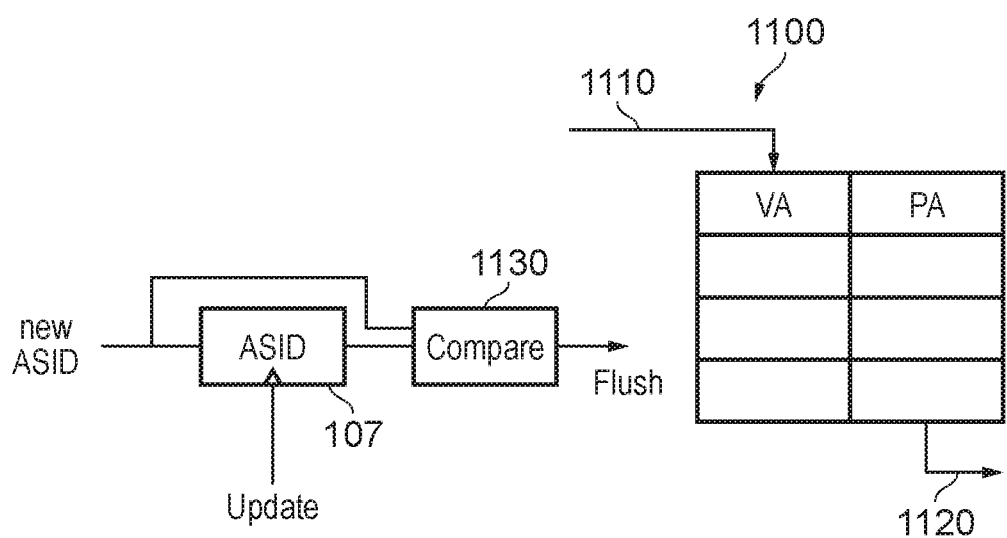

In another example, shown schematically as a TLB 1100 in FIG. 11, if an input VA 1110 matches a TLB entry then the corresponding translated address 1120 is output. However, when the current ASID is updated, the change is detected (for example by a schematic comparator 1130 responsive to the new ASID and the previously held ASID) and is used to initiate flushing of the TLB, which is to say the deletion of all currently held entries. So, any entries held by the TLB are only ever in relation to the current ASID.

Therefore, in the example of FIG. 11, the address translation circuitry is configured to store a current identifier (ASID 107) corresponding to the current hierarchical set of address translation tables; and the one or more processing elements are configured to overwrite the current identifier with a second identifier corresponding to the second hierarchical set of address translation tables. In these examples, control circuitry 1130 may be provided to flush the data defining one or more address translations in response to initiating the overwriting of the current table definition data.

Testing Circuitry and Circuitry Designs

The context witching process described above can involve updating the translation tables to be used and also the ASID. Practically speaking, it can be difficult to achieve all of these changes instantaneously, and so at least some processor systems provide procedures or circuit features to be used in order to avoid incorrect translations being initiated or generated in response to request made during the context switching process.

Techniques will be described below to provide so-called stress testing of these arrangements, or in other words to allow testing of these arrangements in circumstances which are simulations of real circumstances at least as challenging as those found in normal operation, and possibly more challenging.

Figure 12:
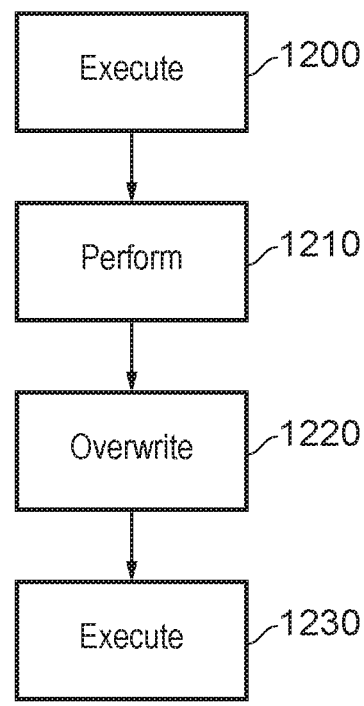
FIG. 12 is a schematic flowchart illustrating a method.

FIG. 12 provides a schematic overview of a method comprising:

executing (at a step 1200) processing instructions;

performing (at a step 1210) address translations between a virtual address space and a physical address space, the address translations being defined by a current hierarchical set of address translation tables selected from two or more hierarchical sets of address translation tables, the address translation being responsive to current table definition data providing at least a pointer to a memory location of the current hierarchical set of address translation tables;

overwriting (at a step 1220) the current table definition data with second table definition data providing at least a pointer to a memory location of a second, different, hierarchical set of address translation tables of the two or more hierarchical sets of address translation tables;

executing (at a step 1230) test instructions requiring address translation before and after the overwriting of the current table definition data and to detect whether the address translations required by the test instructions are correctly performed.

The step 1230 can involve comparing the contents of the PA space 1500 with reference contents related to the expected outcome of the test instructions.

This process will be discussed further with respect to FIG. 13 which is a schematic timing diagram with time running from left to right as drawn.

A time t3 represents a stage at which the overwriting step 1220 is performed. this is not as involved as a full context switch, involving in some examples just the overwriting of the TTBR and optionally the ASID values) and so can be performed much more quickly than a context switch.

The PE 100 executes test instructions shown schematically as a block 1300 before the time t3, and executes test instructions shown by a block 1310 after the time t3. A gap is drawn before and after the time t3 but in fact in some example arrangements this gap can be effectively zero in that the test instructions can be carried out up to the instruction preceding the instruction associated with overwriting the TTBR and ASID, and can restart straight after those instructions.

Assuming that the PE 100 robustly and correctly handles the change in TTBR and ASID, then address translations carried out in response to the instructions 1300 and those carried out in response to the instructions 1310 will all be correctly performed and the step 1230 will provide an affirmative (correct) outcome.

However, if the latency or delay involved in an address translation means that an address translation can span the time t3, such as an address translation 1320 started within the instructions 1300 but not completed until after the time t3, then it is possible that incorrect parameters may be used for at least part of the performance of this address translation. This could lead to an incorrect translation and a negative (failed) outcome from the step 1230.

Figure 14:
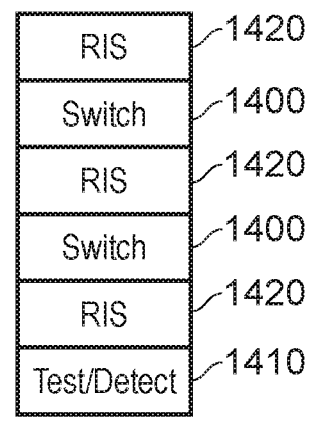
FIG. 14 schematically illustrates a series of instructions.

The overwriting step 1220 can be performed by a so-called macro, which is a set of instructions to perform the overwriting step 1220, and which can be interspersed within a series of test instructions, for example randomly generated test instructions, for example in the form shown schematically in FIG. 14 which illustrates a set of instructions in an execution order from the top of the page downwards and in which a switcher macro 1400 is inserted. The process ends with instructions 1410 to detect whether the PA space contains the correct contents, given the nature of the memory accesses (which may include at least some write accesses) initiated by the groups of (for example, plural) test instructions ("RIS" or "random instruction set" or in other words test instructions randomly or pseudorandomly selected, for example from a set of candidate test instructions relating to data write operations to various virtual addresses) 1420. This provides an example in which the test instructions comprise one or more groups of instructions 1420. In examples, at least one group of the test instructions comprise data write instructions to test virtual addresses; and the one or more processing elements are configured to detect whether the physical addresses translated from the test virtual addresses have the correct contents (or in other words, the expected contents with respect to the contents which were written to those virtual addresses in response to the test instructions.

Therefore, the apparatus of FIG. 1, operating in accordance with the method of FIG. 12, can provide an example of data processing apparatus comprising:

one or more processing elements 100 to execute processing instructions;

address translation circuitry 102, 130 to perform address translations between a virtual address space and a physical address space, the address translations being defined by a current hierarchical set of address translation tables selected from two or more hierarchical sets of address translation tables (ALT_REGION0, 1 . . . n), the address translation circuitry being responsive to current table definition data (TTBR 135, optionally ASID 107) providing at least a pointer to a memory location of the current hierarchical set of address translation tables;

the one or more processing elements being configured to overwrite the current table definition data with second table definition data providing at least a pointer to a memory location of a second, different, hierarchical set of address translation tables of the two or more hierarchical sets of address translation tables;

the one or more processing elements being configured to execute test instructions requiring address translation before and after the overwriting of the current table definition data by the control circuitry and to detect whether the address translations required by the test instructions are correctly performed.

Test VA and PA Spaces

Figure 15:
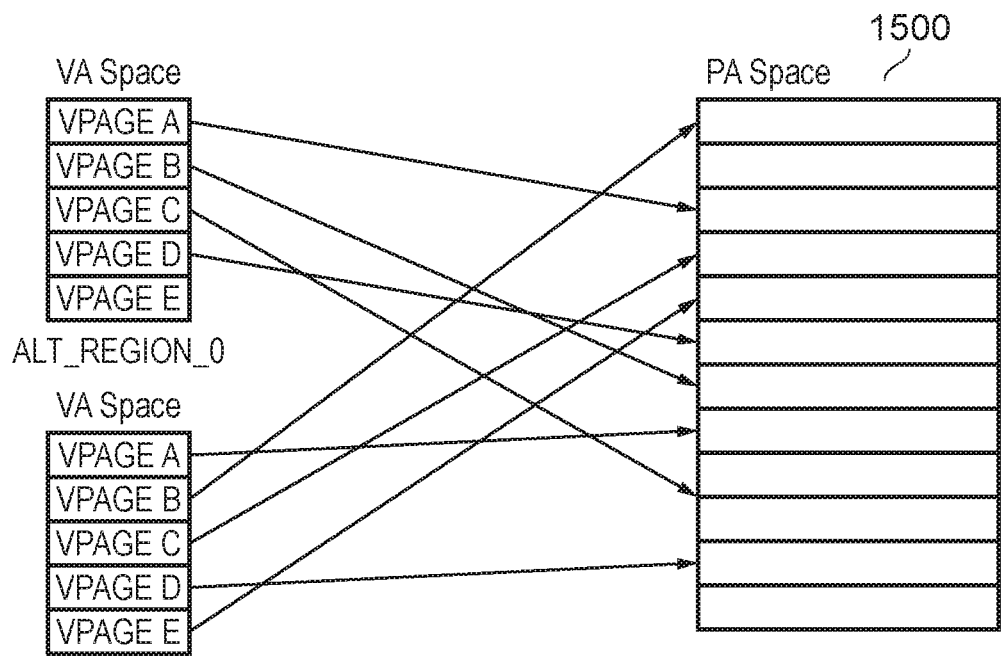
FIG. 15 schematically illustrates a set of address mappings.
Figure 15:
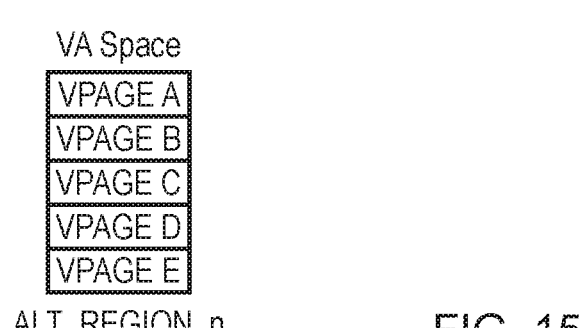

In example arrangements, multiple test VA spaces are established, each of which maps individually to the same PA space. In FIG. 15, these spaces are referred to as ALT_REGION0, ALT_REGION1 . . . ALT_REGIONn. They all point to respective different PA spaces 1500. Their TTBR and ASID values are derived in advance of the test so as to be ready for a rapid overwriting at the step 1220. At an instance of the time t3, at which the overwriting step 1220 is performed, parameters defining one of these regions are overwritten by parameters defining another of the regions.

In example arrangements the VAs used by the test instructions are mapped by all of the VA regions, though they point to different respective PAs.

This provides an example in which the two or more hierarchical sets of address translation tables define translations between a virtual address space and different respective physical address spaces.

Variations of the Test Procedure

In some examples, so-called instruction synchronisation barrier or ISB instructions can be inserted into the instruction sequence of FIG. 14. For example, once such example sequence may involve:

change of TTBR to a switcher table with global faulting entries (GFE) (an architectural feature which kills or terminates translations initiated before this stage)

ISB change ASID to alternate value

ISB change of TTBR to the next ALT region table to be tested

ISB

Figure 13:
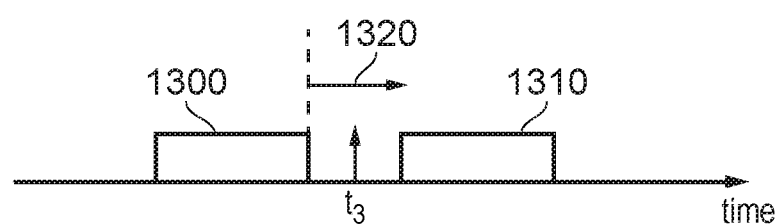
FIG. 13 is a schematic timing diagram.

The use of the GFE and ISBs can provide an environment in which translations such as that shown schematically as the translation 1320 in FIG. 13 cannot occur, so this can provide a reference standard for how translations should be handled before and after the time t3 of the step 1220. The GFE and ISB can then be omitted in other tests to detect how the system reacts to a harsher and more stressed test.

The use of the ISB can provide an example in which the one or more processing elements are configured to execute a barrier instruction to flush any address translations in progress before the overwriting of the current table definition data with the second table definition data.

As discussed above, at the end of the test, all the ALT regions and registers are checked to detect if any of the memory accesses has used a wrong translation.

Example arrangements to provide further stress to the system under test can include the following:

1. Translation page table walks are programmed as non-cacheable in order to slow them down and increase chances of a walk being in progress (as for example with the translation 1320) when a switch (step 1220) occurs or is in progress
2. The test performs random TLB invalidate operations on virtual addresses used by the test to increase the chances of translation table walks.
3. The test initiates speculative translation page table walks on both data side as well as instruction side just before the translation switch by having:
   a. software preload instructions
   b. access patterns that would activate a hardware prefetcher
   c. branches and load store instructions in the not taken path of branches The principles discussed above can be applied to various types of operations to test data processing circuitry. For example:
  the testing of an emulation of the data processing circuitry;
  the testing of a programmable implementation of the data processing circuitry, such as an implementation using a field programmable gate array (FPGA) or the like;
  the testing of a hardware or silicon (or other physical) fabrication of the data processing circuitry;
  one or more combinations of the above categories The testing of hardware and programmable hardware implementations can be performed using the techniques discussed above. A description will now be provided of additional considerations relating to the testing of an emulation of the data processing circuitry.

Emulation

A typical early stage in the design of a complex or expensive-to-fabricate circuit is to employ emulation or simulation of the circuit's functionality, timing and the like, before any physical circuitry is actually fabricated. Simulation or emulation in a virtualised environment will be discussed below. The techniques described above can apply not only to the testing of a physical circuit or "device under test" (DUT) but also to the testing of an emulation of that circuit.

Figure 16:
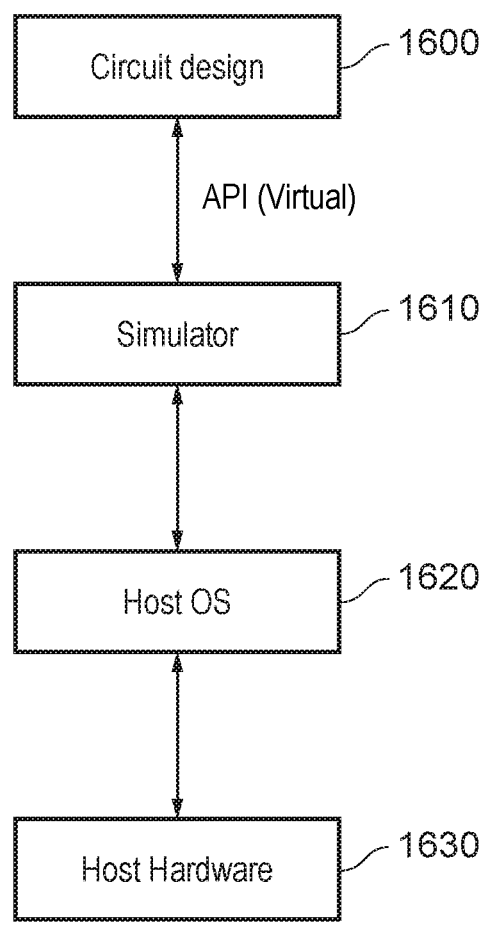
FIG. 16 schematically illustrates the use of a virtual environment for circuit emulation.

FIG. 16 illustrates such a simulator implementation that may be used as part of the design process for a network on chip (NoC), system on chip (SoC) or the like. Typically, a model of a proposed circuit is established using a hardware descriptor language such as Verilog, SystemVerilog or VHDL. The model can include IP modules or other modules such as the verification module discussed above. The model is executed by a simulator as a first stage of verification.

Such simulators can provide a software based implementation of a hardware architecture. It can be cheaper and easier to test a circuit design, in terms of its overall functionality, timing constraints, connectivity and the like, in this way rather than fabricating a DUT for initial testing. The process also allows variations in the design to be easily incorporated and tested.

Varieties of simulator computer programs include emulators, virtual machines, models, and binary translators, including dynamic binary translators. Typically, a simulator implementation may run on a host processor or hardware 1630, optionally running a host operating system 1620, supporting the simulator program 1610. In some arrangements, there may be multiple layers of simulation between the hardware 1630 and the circuit design 1600, and/or multiple distinct simulation environments provided on the same host processor.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1630), some simulated embodiments may make use of the host hardware, where suitable.

The simulator program 1610 may be stored on a computer-readable storage medium (which may be a non-transitory medium), and provides a program interface (simulation environment) to the target code 1600 (which may include applications, operating systems and a hypervisor) which is the same as the application program interface of the hardware architecture being modelled by the simulator program 1610. Thus, the circuit design 1600, including the functionality of the verification module discussed above, may be executed from within the simulator program 1610, so that a host computer 1630 which does not actually have the hardware features of the circuitry discussed above can in fact emulate these features.

Therefore the arrangement of FIG. 16 in connection with the test procedures discussed above can provide an example of a computer program for controlling a host data processing apparatus to provide a simulation environment comprising:

one or more processing elements to execute processing instructions;

an address translation module to perform address translations between a virtual address space and a physical address space, the address translations being defined by a current hierarchical set of address translation tables selected from two or more hierarchical sets of address translation tables, the address translation module being responsive to current table definition data providing at least a pointer to a memory location of the current hierarchical set of address translation tables;

the one or more processing elements being configured to overwrite the current table definition data with second table definition data providing at least a pointer to a memory location of a second, different, hierarchical set of address translation tables of the two or more hierarchical sets of address translation tables;

the one or more processing elements execute test instructions requiring address translation before and after the overwriting of the current table definition data and to detect whether the address translations required by the test instructions are correctly performed.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function, in which case software or program instructions by which the function is performed, and a providing medium such as a non-transitory machine-readable medium by which such software or program instructions are provided (for example, stored) are considered to represent embodiments of the disclosure. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data processing apparatus comprising:
one or more processing elements to execute processing instructions;
address translation circuitry to perform address translations between a virtual address space and a physical address space, the address translations being defined by a current hierarchical set of address translation tables selected from two or more hierarchical sets of address translation tables, the address translation circuitry being responsive to current table definition data providing at least a pointer to a memory location of the current hierarchical set of address translation tables;
the one or more processing elements being configured to overwrite the current table definition data with second table definition data providing at least a pointer to a memory location of a second, different, hierarchical set of address translation tables of the two or more hierarchical sets of address translation tables;
the one or more processing elements being configured to execute test instructions requiring address translation before and after the overwriting of the current table definition data by the control circuitry and to detect whether the address translations required by the test instructions are correctly performed by comparing the contents of the physical address space with an expected outcome of the test instructions.

2. Apparatus according to claim 1, comprising:
a translation buffer to store data defining one or more address translations between the virtual address space and the physical address space.

3. Apparatus according to claim 2, in which:
the translation buffer is configured to associate an identifier with each of the one or more address translations, the identifier indicating a corresponding one of the hierarchical set of address translation tables; and
the address translation circuitry is configured to apply an address translation to a given virtual address using an address translation stored by the translation buffer when an address translation of that virtual address having an associated identifier corresponding to the current hierarchical set of address translation tables is stored by the translation buffer.

4. Apparatus according to claim 3, in which:
the address translation circuitry is configured to store a current identifier corresponding to the current hierarchical set of address translation tables; and
the one or more processing elements are configured to overwrite the current identifier with a second identifier corresponding to the second hierarchical set of address translation tables.

5. Apparatus according to claim 2, comprising control circuitry to flush the data defining one or more address translations in response to initiating the overwriting of the current table definition data.

6. Apparatus according to claim 1, in which the two or more hierarchical sets of address translation tables define translations a virtual address space and different respective physical address spaces.

7. Apparatus according to claim 6, in which the test instructions comprise one or more groups of instructions.

8. Apparatus according to claim 7, in which:
at least one group of the test instructions comprise data write instructions to test virtual addresses; and
the one or more processing elements are configured to detect whether the physical addresses translated from the test virtual addresses have correct contents.

9. Apparatus according to claim 1, in which the one or more processing elements are configured to execute a barrier instruction to flush any address translations in progress before the overwriting of the current table definition data with the second table definition data.

10. Data processing apparatus according to claim 1, in which:
the one or more processing elements are configured to execute processing instructions of a current program task;
the one or more processing elements are configured to switch between processing tasks and to provide context data relating to execution of a program task in response to switching from execution of that processing task; and to receive context data, provided by that processing element or another processing element, at resumption of execution of a program task;
the context data for a processing task including translation context data comprising at least the table definition data providing at least a pointer to a memory location of a hierarchical set of address translation tables defining address translations between a virtual address space applicable to that program task and the physical address space.

11. A method comprising:
executing processing instructions;
performing address translations between a virtual address space and a physical address space, the address translations being defined by a current hierarchical set of address translation tables selected from two or more hierarchical sets of address translation tables, the address translation being responsive to current table definition data providing at least a pointer to a memory location of the current hierarchical set of address translation tables;
overwriting the current table definition data with second table definition data providing at least a pointer to a memory location of a second, different, hierarchical set of address translation tables of the two or more hierarchical sets of address translation tables;
executing test instructions requiring address translation before and after the overwriting of the current table definition data and to detect whether the address translations required by the test instructions are correctly performed by comparing the contents of the physical address space with an expected outcome of the test instructions.

12. A non-transitory, computer-readable storage medium storing a computer program for controlling a host data processing apparatus to provide a simulation environment comprising:
one or more processing elements to execute processing instructions;
an address translation module to perform address translations between a virtual address space and a physical address space, the address translations being defined by a current hierarchical set of address translation tables selected from two or more hierarchical sets of address translation tables, the address translation module being responsive to current table definition data providing at least a pointer to a memory location of the current hierarchical set of address translation tables;
the one or more processing elements being configured to overwrite the current table definition data with second table definition data providing at least a pointer to a memory location of a second, different, hierarchical set of address translation tables of the two or more hierarchical sets of address translation tables;
the one or more processing elements execute test instructions requiring address translation before and after the overwriting of the current table definition data and to detect whether the address translations required by the test instructions are correctly performed by comparing the contents of the physical address space with an expected outcome of the test instructions.

* * * * *